United States Patent
Shintani et al.

(10) Patent No.: US 8,662,223 B2
(45) Date of Patent: Mar. 4, 2014

(54) WORK VEHICLE AND METHOD FOR CONTROLLING WORK VEHICLE

(75) Inventors: Satoru Shintani, Takatsuki (JP); Tomohiro Nakagawa, Hirakata (JP); Hironori Toda, Yawata (JP); Hiroshi Nakagami, Hirakata (JP); Kazuki Kure, Kishiwada (JP)

(73) Assignee: Komatsu Ltd., Tokyo (JP)

( * ) Notice: Subject to any disclaimer, the term of this patent is extended or adjusted under 35 U.S.C. 154(b) by 2 days.

(21) Appl. No.: 13/514,540

(22) PCT Filed: Sep. 20, 2011

(86) PCT No.: PCT/JP2011/071301
§ 371 (c)(1),
(2), (4) Date: Jun. 7, 2012

(87) PCT Pub. No.: WO2012/056830
PCT Pub. Date: May 3, 2012

(65) Prior Publication Data
US 2012/0241235 A1 Sep. 27, 2012

(30) Foreign Application Priority Data
Oct. 26, 2010 (JP) .................................. 2010-239227

(51) Int. Cl.
*B60K 11/00* (2006.01)

(52) U.S. Cl.
USPC ........................... 180/68.1; 180/68.2; 180/68.3

(58) Field of Classification Search
CPC ....................................................... B60K 11/00
USPC .......................................... 180/68.1, 68.2, 68.3
See application file for complete search history.

(56) References Cited

U.S. PATENT DOCUMENTS

| | | | | |
|---|---|---|---|---|
| 3,059,745 A | * | 10/1962 | Tauschek | 192/58.62 |
| 6,129,193 A | * | 10/2000 | Link | 192/84.1 |
| 6,349,882 B1 | * | 2/2002 | Kita et al. | 236/34 |
| 6,481,388 B1 | * | 11/2002 | Yamamoto | 123/41.12 |
| 7,373,239 B2 | * | 5/2008 | Kamado et al. | 701/103 |
| 7,685,816 B2 | * | 3/2010 | Yabuki | 60/456 |
| 8,109,375 B2 | * | 2/2012 | Swanson et al. | 192/48.2 |
| 2009/0025661 A1 | | 1/2009 | Itoga et al. | |
| 2010/0107996 A1 | | 5/2010 | Shintani et al. | |

FOREIGN PATENT DOCUMENTS

| | | |
|---|---|---|
| CN | 101160456 A | 4/2008 |
| CN | 101784773 A | 7/2010 |
| JP | 8-135772 A | 5/1996 |
| JP | 2001-182535 A | 7/2001 |

OTHER PUBLICATIONS

International Search Report of corresponding PCT Application No. PCT/JP2011/071301.
The Chinese Office Action issued on Sep. 22, 2013 for the corresponding Chinese application No. 201180005419.0.

* cited by examiner

*Primary Examiner* — Hau Phan
(74) *Attorney, Agent, or Firm* — Global IP Counselors, LLP

(57) ABSTRACT

A controller of a work vehicle sets the upper limit of a fan target rotational speed in accordance with an engine rotational speed. The controller reduces an upper limit of the fan target rotational speed further when a lock-up clutch is in an engaged state than when the lock-up clutch is in a released state.

3 Claims, 4 Drawing Sheets

WORK VEHICLE AND METHOD FOR CONTROLLING WORK VEHICLE

CROSS-REFERENCE TO RELATED APPLICATIONS

This application claims priority to Japanese Patent Application No. 2010-239227 filed on Oct. 26, 2010, the disclosure of which is hereby incorporated herein by reference in its entirety.

TECHNICAL FIELD

The present invention relates to a work vehicle and a method for controlling a work vehicle.

BACKGROUND ART

Bulldozers and other work vehicles are provided with a cooling device for cooling an engine coolant. The cooling device has a cooling fan and a hydraulic motor. The hydraulic motor is driven by hydraulic pressure supplied from a hydraulic pump, and the cooling fan is thereby rotated. The work vehicle is also provided with a controller for controlling the rotational speed of the cooling fan. The controller sets a target rotational speed (referred to hereinafter as the "fan target rotational speed") for the cooling fan on the basis of the coolant temperature, the temperature of a torque converter oil, and other factors as disclosed in Japanese Laid-open Patent Publication No. 2001-182535, for example. The controller also sets an upper limit for the fan target rotational speed in accordance with the engine rotational speed.

SUMMARY

The upper limit of the fan target rotational speed mentioned above is uniformly determined in accordance with the engine rotational speed. The upper limit of the fan target rotational speed is therefore set so as to be irrespective of the actual heat balance of the vehicle. The upper limit of the fan target rotational speed is therefore preferably set somewhat high in order to prevent a situation in which cooling ability is inadequate. For example, a circumstance is estimated in which the highest cooling ability is required, and the upper limit of the fan target rotational speed is set so that adequate cooling ability can be realized in such a circumstance.

However, the actual circumstances of a work vehicle are not limited only to a circumstance in which the highest cooling ability is needed, such as described above. Cooling ability may therefore be excessive in some cases. In these cases, a portion of the engine output is needlessly expended to drive the cooling device.

An object of the present invention is to provide a work vehicle and method for controlling a work vehicle whereby fuel economy can be enhanced by preventing excess cooling ability.

A work vehicle according to a first aspect of the present invention comprises an engine, a travel device, a power transmission device, a cooling fan, and a controller. The travel device is a device for causing the vehicle to travel. The power transmission device has a transmission and a torque converter equipped with a lock-up clutch, and transmits drive power from the engine to the travel device. The cooling fan cools a coolant of the engine and a power transmission fluid of the torque converter. The controller sets an upper limit of a target rotational speed of the cooling fan in accordance with an engine rotational speed. The controller also reduces the upper limit of the fan target rotational speed further when the lock-up clutch is in an engaged state than when the lock-up clutch is in a released state.

A work vehicle according to a second aspect of the present invention is the work vehicle according to the first aspect, wherein the controller stores first information and second information. The first information is information indicating a relationship between the engine rotational speed and the upper limit of the fan target rotational speed. The second information is information indicating a relationship between the engine rotational speed and the upper limit of the fan target rotational speed and setting the upper limit of the fan target rotational speed to a lower value than indicated in the first information. The controller sets the upper limit of the fan target rotational speed on the basis of the first information when the lock-up clutch is in the released state. The controller sets the upper limit of the fan target rotational speed on the basis of the second information when the lock-up clutch is in the engaged state.

A work vehicle according to a third aspect of the present invention is the work vehicle according to the second aspect, wherein the controller sets the upper limit of the fan target rotational speed on the basis of the second information regardless of whether the lock-up clutch is in the engaged state or the released state when a speed gear of the transmission is at a predetermined high-speed gear having a higher speed than a lowest-speed gear.

A method for controlling a work vehicle according to a fourth embodiment of the present invention is a method for controlling a work vehicle provided with an engine, a travel device, a power transmission device, and a cooling fan. The travel device is a device for causing the vehicle to travel. The power transmission device has a torque converter equipped with a lock-up clutch, and a transmission, and transmits drive power from the engine to the travel device. The cooling fan cools a coolant of the engine and a power transmission fluid of the torque converter. The method for controlling a work vehicle comprises setting an upper limit of a fan target rotational speed in accordance with an engine rotational speed such that the upper limit of the fan target rotational speed is reduced further when the lock-up clutch is in an engaged state than when the lock-up clutch is in a released state.

In the work vehicle according to the first aspect of the present invention, the upper limit of the fan target rotational speed is reduced further when the lock-up clutch is in an engaged state than when the lock-up clutch is in are/cased state. When the lock-up clutch is in the released state, the drive power from the engine is transmitted in the torque converter via the power transmission fluid of the torque converter. The power transmission fluid of the torque converter is therefore heated significantly. On the other hand, when the lock-up clutch is in the engaged state, an input shaft and output shaft of the torque converter are directly coupled via the lock-up clutch. There is therefore small heating of the power transmission fluid of the torque converter. Consequently, the ability to cool the power transmission fluid of the torque converter may be smaller when the lock-up clutch is in the engaged state than when the lock-up clutch is in the released state. Therefore, by reducing the upper limit of the fan target rotational speed when the lock-up clutch is in the engaged state, an excess of cooling ability is prevented, and fuel economy can be enhanced.

In the work vehicle according to the second aspect of the present invention, the upper limit of the fan target rotational speed is set on the basis of the first information when the lock-up clutch is in the released state. Since a high upper limit is therefore set for the fan target rotational speed, a high cooling can be maintained. When the lock-up clutch is in the engaged state, however, the upper limit of the fan target rotational speed is set on the basis of the second information. Since a low upper limit is therefore set for the fan target rotational speed, an excess of cooling ability is prevented, and fuel economy can be enhanced.

In the work vehicle according to the third aspect of the present invention, when the speed gear of the transmission is a high-speed gear, the upper limit of the fan target speed is set on the basis of the second information even when the lock-up clutch is in the released state. When the speed gear of the transmission is a high-speed gear, a favorable heat balance can easily be maintained in the work vehicle even when the cooling ability of the cooling fan is low. An inadequate cooling ability is therefore prevented even when the lock-up clutch is in the released state. An excess of cooling ability by the cooling fan is also prevented, and fuel economy can thereby be enhanced.

In the work vehicle according to the fourth aspect of the present invention, the upper limit of the fan target rotational speed is reduced further when the lock-up clutch is in an engaged state than when the lock-up clutch is in a released state. When the lock-up clutch is in the released state, the drive power from the engine is transmitted in the torque converter via the power transmission fluid of the torque converter. The power transmission fluid of the torque converter is therefore heated significantly. On the other hand, when the lock-up clutch is in the engaged state, an input shaft and output shaft of the torque converter are directly coupled via the lock-up clutch. There is therefore small heating of the power transmission fluid of the torque converter. Consequently, the ability to cool the power transmission fluid of the torque converter may be smaller when the lock-up clutch is in the engaged state than when the lock-up clutch is in the released state. Therefore, by reducing the upper limit of the fan target rotational speed when the lock-up clutch is in the engaged state, an excess of cooling ability is prevented, and fuel economy can be enhanced.

DETAILED DESCRIPTION OF THE EMBODIMENTS

Figure 1:
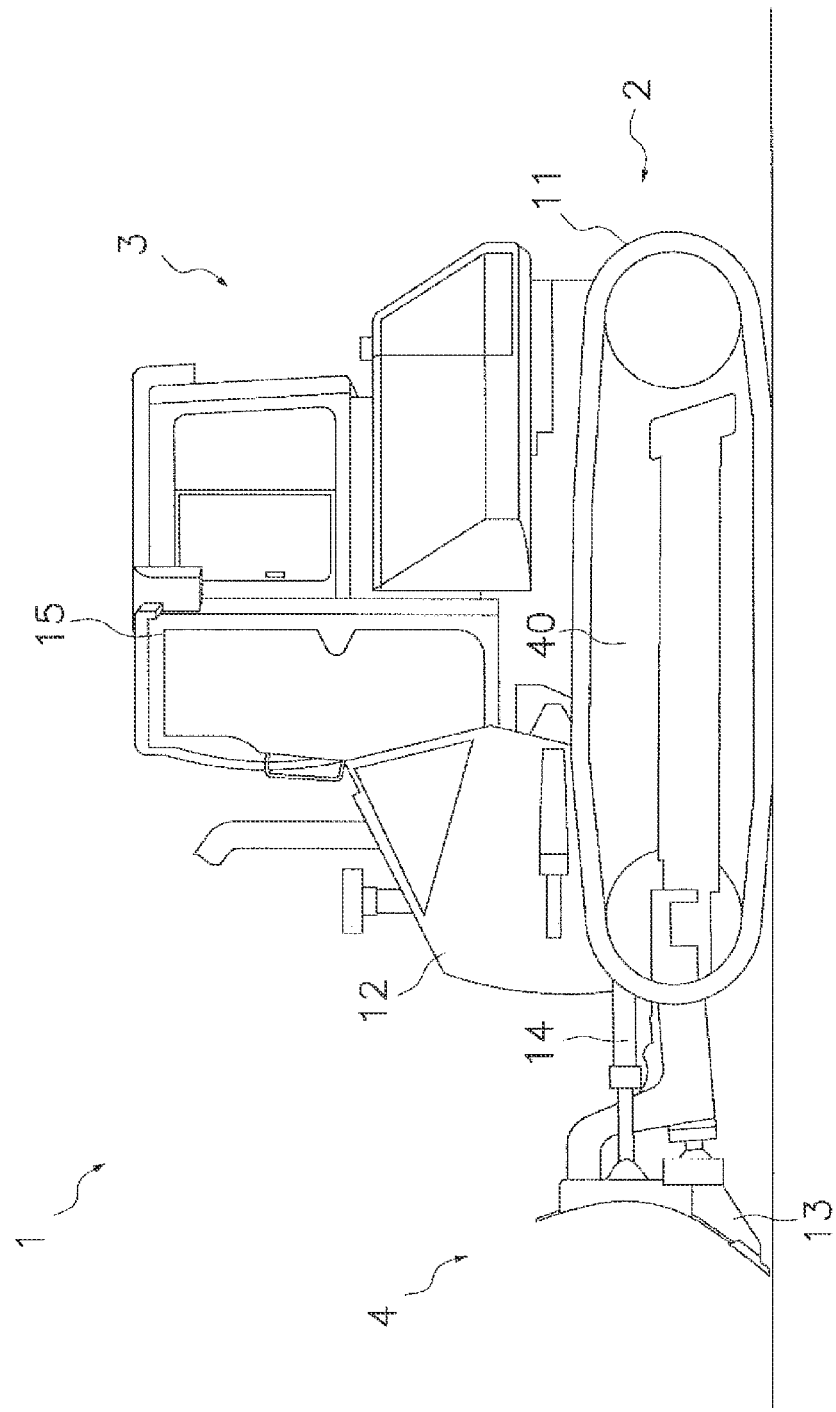
FIG. 1 is a side view showing the work vehicle.

FIG. 1 is a side view showing the outer configuration of a work vehicle 1 according to an embodiment of the present invention. The work vehicle 1 is a bulldozer provided with left and right travel units 2, a vehicle main body 3, and a work implement 4.

The travel units 2 are devices for causing the vehicle to travel, and have crawler belts 11. The work vehicle 1 travels by the driving of the crawler belts 11.

The vehicle main body 3 is disposed between the left and right travel units 2, and an engine compartment 12 is provided at the front of the vehicle main body 3. An engine 5 and cooling device 7 described hereinafter are housed in the engine compartment 12. A drivers cab 15 is provided behind the engine compartment 12.

The work implement 4 is provided in front of the engine compartment 12, and has a blade 13 provided so as to be able to pivot up and down, and a hydraulic cylinder 14 for driving the blade 13.

Figure 2:
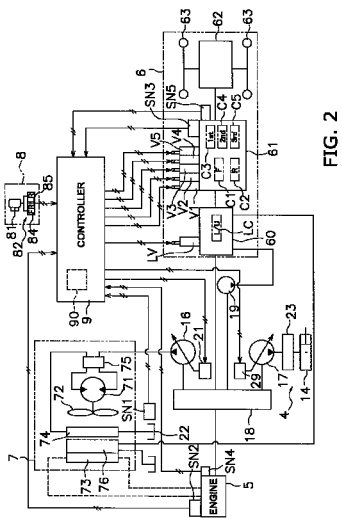
FIG. 2 is a block diagram showing the internal configuration of the work vehicle.

FIG. 2 is a block diagram showing the internal configuration of the work vehicle 1. The work vehicle 1 is provided with the engine 5, a power transmission device 6, a first hydraulic pump 16, a second hydraulic pump 17, a third hydraulic pump 19, a cooling device 7, an operating device 8, various sensors SN1 through SN5, and a controller 9.

The engine 5 is a diesel engine, and the output of the engine 5 is controlled by adjusting the injected amount of fuel from a fuel injection pump (not shown). A governor (not shown) is controlled by the controller 9 to adjust the fuel injection amount. An all-speed control-type governor is usually used as the governor, and the engine rotational speed and the fuel injection amount are adjusted according to load so that the actual engine rotational speed matches an engine rotational speed command value set by the controller 9. Specifically, the governor increases and decreases the fuel injection amount so that there is no difference between the engine rotational speed command value and the actual engine rotational speed.

The power transmission device 6 is a device for transmitting drive power from the engine 5 to the travel units 2 described above. The power transmission device 6 is provided with a transmission 61, a final reduction device 62, sprocket wheel 63, and a torque converter 60 equipped with a lock-up clutch LC. The output of the engine 5 is transmitted to the abovementioned travel units 2 via the torque converter 60, the transmission 61, the final reduction device 62, and the sprocket wheel 63.

The torque converter 60 is coupled to an output shaft of the engine 5 via a PTO (power take-off device) shaft 18. The lock-up clutch LC is switched to an engaged state and a released state by hydraulic fluid supplied from the third hydraulic pump 19. When the lock-up clutch LC is in the engaged state, an input shaft and output shaft of the torque converter 60 are directly coupled. When the lock-up clutch LC is in the released state, drive power is transmitted in the torque converter 60 via torque converter oil, which is a power transmission fluid. The torque converter oil is the hydraulic fluid supplied to the torque converter 60 from the third hydraulic pump 19. The supply of hydraulic fluid to the lock-up clutch LC is controlled by a lock-up solenoid valve LV which is controlled by a control signal from the controller 9.

The transmission 61 has a forward-travel hydraulic clutch (referred to hereinafter as the "F clutch") C1 and a reverse-travel hydraulic clutch (referred to hereinafter as the "R clutch") C2, and forward travel or reverse travel is performed by selecting the F clutch C1 or the R clutch C2. The F clutch C1 and the R clutch C2 are switched to an engaged state and a released state by the hydraulic fluid supplied from the third hydraulic pump 19. Forward travel is performed when the F clutch C1 is in the engaged state and the R clutch C2 is in the released state, and reverse travel is performed when the F clutch C1 is in the released state and the R clutch C2 is in the engaged state. When both the F clutch C1 and the R clutch C2 are in the released state, a neutral state occurs in which the drive power from the engine 5 is not transmitted. The supply of hydraulic fluid to the F clutch C1 is controlled by a forward-travel solenoid valve V1, and the supply of hydraulic fluid to the R clutch C2 is controlled by a reverse-travel solenoid valve V2. The solenoid valves V1, V2 are controlled by a control signal from the controller 9.

The transmission 61 also has a first-speed hydraulic clutch (referred to hereinafter as the "$1^{st}$ clutch") C3, a second-speed hydraulic clutch (referred to hereinafter as the "$2^{nd}$ clutch) C4, and a third-speed hydraulic clutch (referred to hereinafter as the "$3^{rd}$ clutch") C5. The speed gear of the transmission 61 is switched by selection of any of the speed change clutches C3 through C5. The $1^{st}$ clutch C3, $2^{nd}$ clutch C4, and $3^{rd}$ clutch C5 are each driven by hydraulic fluid supplied from the third hydraulic pump 19, and are switched to an engaged state and a released state. The supply of hydraulic fluid to the $1^{st}$ clutch C3 is controlled by a first-speed solenoid valve V3, the supply of hydraulic fluid to the $2^{nd}$ clutch C4 is controlled by a second-speed solenoid valve V4, and the supply of hydraulic fluid to the $3^{rd}$ clutch C5 is controlled by a third-speed solenoid valve V5. The solenoid valves V3 through V5 are controlled by a control signal from the controller 9.

As described above, the output of the engine 5 is transmitted to the sprocket wheel 63 via the torque converter 60, the transmission 61, and the final reduction device 62, and the sprocket wheel 63 are thereby rotationally driven. As the sprocket wheel 63 are rotationally driven, the crawler belts 11 (see FIG. 1) wrapped around the sprocket wheel 63 are driven, and the work vehicle 1 thereby travels. A portion of the horsepower of the engine 5 is thus expended as travel horsepower for causing the work vehicle 1 to travel.

The first hydraulic pump 16 is coupled to the output shaft of the engine 5 via the PTO shaft 18, and is driven by the drive power of the engine 5. The first hydraulic pump 16 discharges hydraulic fluid for driving the cooling device 7. The first hydraulic pump 16 is a variable-displacement hydraulic pump, and a swashplate actuator 21 varies the tilt angle of a swashplate to vary the pump displacement of the first hydraulic pump 16. The swashplate actuator 21 is controlled by a control signal from the controller 9.

The second hydraulic pump 17 is coupled to the output shaft of the engine 5 via the PTO shaft 18, is driven by the engine 5, and discharges hydraulic fluid for driving the hydraulic cylinder 14 of the work implement 4. The second hydraulic pump 17 is a variable-displacement hydraulic pump, and a swashplate actuator 29 varies the tilt angle of a swashplate to vary the displacement of the second hydraulic pump 17. The swashplate actuator 29 is controlled by a control signal from the controller 9. As the second hydraulic pump 17 is driven by the drive power from the engine 5, hydraulic fluid is supplied to the hydraulic cylinder 14 of the work implement 4 via an electromagnetic switch valve 23. As hydraulic fluid is supplied to the hydraulic cylinder 14, the hydraulic cylinder 14 extends and retracts, thereby driving the blade 13 (see FIG. 1). A portion of the horsepower of the engine 5 is thus expended as operating horsepower for driving the work implement 4.

The cooling device 7 is a device for cooling the engine 5, and is driven by hydraulic fluid supplied from the first hydraulic pump 16. The cooling device 7 has a hydraulic motor 71, a cooling fan 72, a radiator 73, a first oil cooler 76, and a second oil cooler 74.

The hydraulic motor 71 is a hydraulic motor used for the cooling fan 72. The hydraulic motor 71 is driven by hydraulic fluid discharged from the first hydraulic pump 16, and rotationally drives the cooling fan 72. An electromagnetic switch valve 75 is provided between the hydraulic motor 71 and the first hydraulic pump 16. The electromagnetic switch valve 75 is a two-position valve capable of switching the flow direction of hydraulic fluid according to a command signal from the controller 9, thereby enabling the rotation direction of the hydraulic motor 71, i.e., the cooling fan 72, to be controlled. The rotational speed of the hydraulic motor 71, i.e., the rotational speed of the cooling fan 72, is also controlled through control of the pump displacement of the first hydraulic pump 16 by the swashplate actuator 21.

The rotational driving of the cooling fan 72 by the hydraulic motor 71 generates a flow of air that passes through the radiator 73 the first oil cooler 76, and the second oil cooler 74.

The radiator 73 is a device for cooling a coolant of the engine 5. The radiator 73 cools the coolant of the engine 5 by receiving the air flow generated by the cooling fan 72.

The first oil cooler 76 is a device for cooling the torque converter oil from the torque converter 60. The first oil cooler 76 cools the torque converter oil by receiving the air flow generated by the cooling fan 72. Although not shown in FIG. 2, a hydraulic circuit for supplying torque converter oil to the torque converter 60 is partially shared as a hydraulic circuit for supplying hydraulic fluid to the hydraulic clutches C1 through C5 of the transmission 61. Consequently, the second oil cooler 74 also cools the hydraulic fluid from the hydraulic clutches C1 through C5 of the transmission 61.

The second oil cooler 74 is a device for cooling the hydraulic fluid supplied to the hydraulic motor 71 of the cooling device 7. The second oil cooler 74 cools the hydraulic fluid from the hydraulic motor 71 by receiving the air flow generated by the cooling fan 72. The hydraulic fluid from the hydraulic motor 71 enters the second oil cooler 74 through the electromagnetic switch valve 75 and returns to a hydraulic fluid tank 22 after being cooled in the second oil cooler 74. Although not shown in FIG. 2, the hydraulic fluid from the hydraulic cylinder 14 of the work implement 4 also returns to the hydraulic fluid tank 22 after being cooled in the second oil cooler 74 in the same manner. The hydraulic fluid accumulated in the hydraulic fluid tank 22 is pressurized by the first hydraulic pump 16 and the second hydraulic pump 17 and supplied to the hydraulic motor 71 and the hydraulic cylinder 14 from the first hydraulic pump 16 and the second hydraulic pump 17, respectively.

The radiator 73, the first oil cooler 76, and the second oil cooler 74 may each be separately formed. Alternatively, all or some of the radiator 73, first oil cooler 76, and second oil cooler 74 may be formed integrally with each other.

As hydraulic fluid is supplied to the first hydraulic motor 71, the cooling fan 72 is rotationally driven, a flow of air is generated that passes through the radiator 73, the first oil cooler 76, and the second oil cooler 74. The engine 5 coolant flowing through the radiator 73, the torque converter oil flowing through the first oil cooler 76, and the hydraulic fluid flowing through the second oil cooler 74 are thereby cooled. A portion of the horsepower of the engine 5 is thus expended as fan horsepower for driving the cooling device 7 to cool the engine 5 coolant, the torque converter oil, and the hydraulic fluid.

The operating device 8 is housed in the driver's cab 15, and sends operating signals to the controller 9 when operated by an operator. The operating device 8 has a shift switch 81, a travel lever 82, and other components.

The shift switch 81 is a switch for switching the speed gear of the transmission 61. In the work vehicle 1, it is possible to switch from a first speed gear through to a third speed gear, and the operator can manually switch speed gears by operating the shift switch 81.

The travel lever 82 has a forward/reverse lever member 84 and a steering lever member 85. The operator can switch the transmission 61 to a forward-travel state, a reverse-travel state, or a neutral state by operating the forward/reverse lever member 84. The operator can also switch the steering direction of the work vehicle 1 by operating the steering lever member 85.

The various sensors SN1 through SN5 include a first hydraulic fluid temperature sensor SN1, a coolant temperature sensor SN2, a second hydraulic fluid temperature sensor SN3, an engine rotational speed sensor SN4, a transmission rotational speed sensor SN5, or the like. The first hydraulic fluid temperature sensor SN1 detects the temperature (referred to hereinafter as the "hydraulic fluid temperature") of the hydraulic fluid for driving the hydraulic motor 71 of the cooling device 7 and the hydraulic cylinder 14 of the work implement 4. The coolant temperature sensor SN2 detects the temperature (referred to hereinafter as the "coolant temperature") of the coolant of the engine 5. The second hydraulic fluid temperature sensor SN3 detects the temperature of the hydraulic fluid for driving the hydraulic clutches C1 through C5 of the transmission 61. As described above, the hydraulic circuit for supplying torque converter oil to the torque converter 60 is partially shared as a hydraulic circuit for supplying hydraulic fluid for operating the hydraulic clutches C1 through C5 of the transmission 61. Consequently, the temperature of the hydraulic fluid from the hydraulic clutches C1 through C5 matches the temperature (referred to hereinafter as the "torque converter oil temperature") of the torque converter oil. The second hydraulic fluid temperature sensor SN3 therefore detects the torque converter oil temperature. The engine rotational speed sensor SN4 detects the engine rotational speed, which is the actual rotational speed of the engine 5. The transmission rotational speed sensor SN5 detects the vehicle speed of the work vehicle 1 by detecting the rotational speed of the output shaft of the transmission 61. The various information detected by the sensors SN1 through SN5 is inputted to the controller 9.

The controller 9 is composed primarily of a microcomputer, numeric data processor, or other computational processing device, and has a memory unit 90 for storing control data and the like. The controller 9 controls the engine 5, the power transmission device 6, the cooling device 7, the work implement 4, and other components on the basis of operating signals from the operating device 8, detection signals from the sensors SN1 through SN5, control data stored in the memory unit 90, and the like. For example, an engine power curve indicating a relationship between the engine rotational speed and the engine torque is stored in the memory unit 90, and the controller 9 controls the engine 5 on the basis of the engine power curve. The controller 9 switches the lock-up clutch LC of the torque converter 60 and switches the F clutch C1, R clutch C2, and speed change clutches C3 through C5 of the transmission 61 in accordance with operation of the shift switch 81 and the travel lever 82 or automatically on the basis of the vehicle speed and engine rotational speed.

Figure 3:
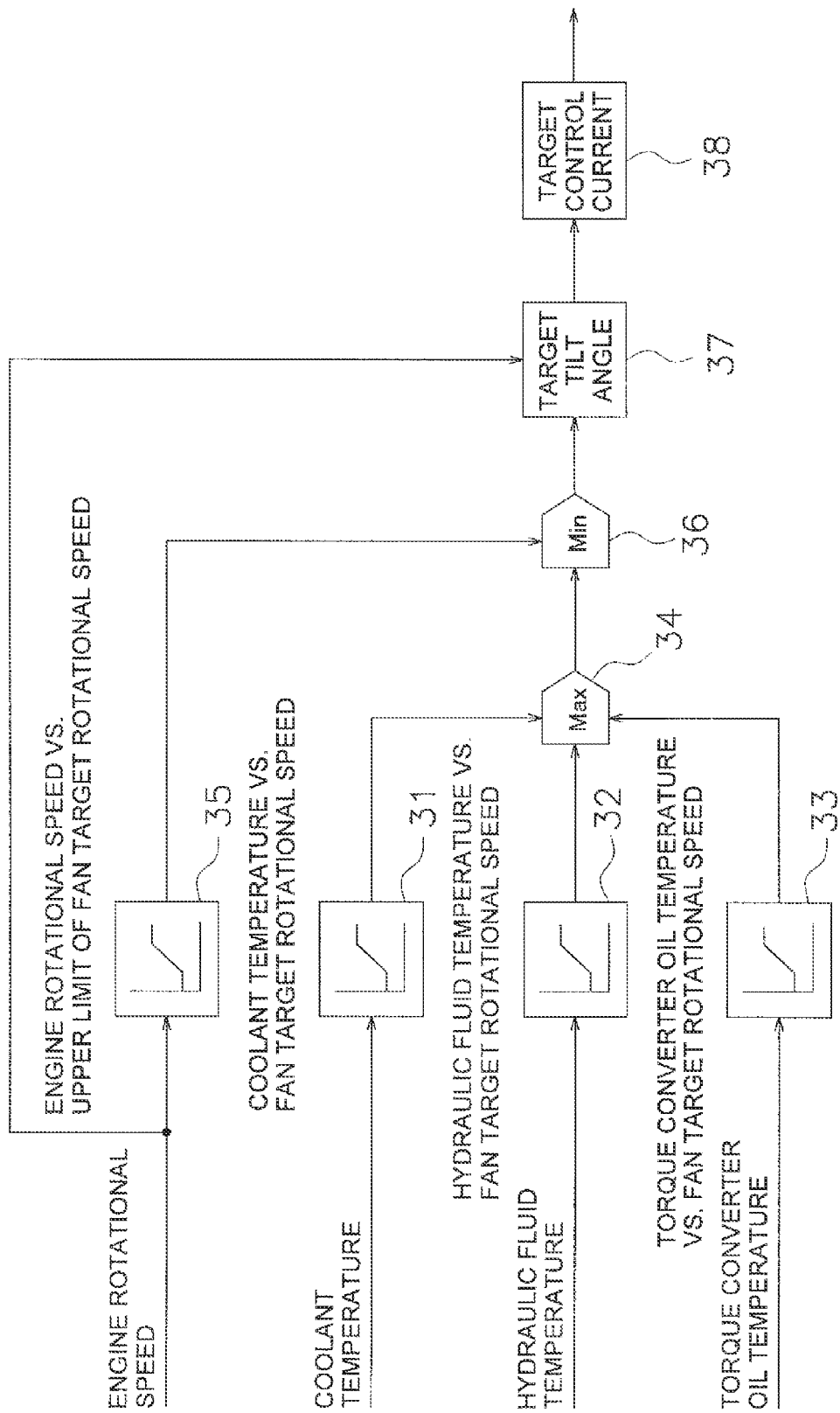
FIG. 3 is a functional block diagram showing the controller.

Of the control of the work vehicle 1 performed by the controller 9, control of the cooling device 7 will be described in detail based on 3. FIG. 3 is a block diagram showing the processing functions of the controller 9. The controller 9 controls the rotational speed of the cooling fan 72 on the basis of the coolant temperature, the hydraulic fluid temperature, the torque converter oil temperature, and the engine rotational speed. Specifically, the controller 9 has a first target rotational speed computer 31, a second target rotational speed computer 32, a third target rotational speed computer 33, a maximum value selector 34, an upper limit computer 35, a minimum value selector 36, a tilt angle computer 37, and a control current computer 38.

The first target rotational speed computer 31 references a map stored in the memory unit 90 and computes a fan target rotational speed from the coolant temperature detected by the coolant temperature sensor SN2. A relationship between the coolant temperature and the fan target rotational speed is set in the map, in which the fan target rotational speed increases as the coolant temperature increases.

The second target rotational speed computer 32 references a map stored in the memory unit 90 and computes the fan target rotational speed of the cooling fan 72 from the temperature of the hydraulic fluid detected by the first hydraulic fluid temperature sensor SN1. A relationship between the hydraulic fluid temperature and the fan target rotational speed is set in the map in the memory unit 90, in which the fan target rotational speed increases as the hydraulic fluid temperature increases.

The third target rotational speed computer 33 references a map stored in the memory unit 90 and computes the fan target rotational speed of the cooling fan 72 from the torque converter oil temperature detected by the second hydraulic temperature sensor SN3. A relationship between the torque converter oil temperature and the fan target rotational speed is set in the map in the memory unit 90, in which the fan target rotational speed increases as the torque converter oil temperature increases.

The maximum value selector 34 selects the highest rotational speed from among the fan target rotational speed calculated by the first target rotational speed computer 31, the fan target rotational speed calculated by the second target rotational speed computer 32, and the fan target rotational speed calculated by the third target rotational speed computer 33.

The upper limit computer 35 references a map stored in the memory unit 90 and computes the upper limit of the fan target rotational speed from the engine rotational speed detected by the engine rotational speed sensor SN4. A relationship between the engine rotational speed and the upper limit of the fan target rotational speed is set in the map in the memory unit 90, in which the upper limit of the fan target rotational speed increases as the engine rotational speed increases. Consequently, the controller 9 sets the upper limit of the fan target rotational speed in accordance with the engine rotational speed.

The minimum value selector 36 selects the smaller of the fan target rotational speed selected by the maximum value selector 34 and the upper limit of the fan target rotational speed calculated by the upper limit computer 35. Consequently, in the minimum value selector 36, the fan target rotational speed is corrected so that the fan target rotational speed selected by the maximum value selector 34 does not exceed the upper limit of the fan target rotational speed calculated by the upper limit computer 35. A detailed description of computation of the upper limit of the fan target rotational speed by the upper limit computer 35 will be explained below.

From the engine rotational speed detected by the engine rotational speed sensor SN4 and the fan target rotational speed selected by the minimum value selector 36, the tilt angle computer 37 computes the target tilt angle of the first hydraulic pump 16 in order to obtain the fan target rotational speed.

The rotational speed of the cooling fan 72 is determined on the basis of the rotational speed of the hydraulic motor 71. The rotational speed of the hydraulic motor 71 is determined by the flow rate of hydraulic fluid supplied to the hydraulic motor 71. The flow rate of hydraulic fluid supplied to the hydraulic motor 71 corresponds to the discharge flow rate of the first hydraulic pump 16. The discharge flow rate of the first hydraulic pump 16 is determined by the tilt angle and rotational speed of the first hydraulic pump 16. The rotational speed of the first hydraulic pump 16 is determined by the rotational speed of the engine 5. Consequently when the engine rotational speed is known, it is possible to calculate the target tilt angle of the first hydraulic pump 16 for obtaining the fan target rotational speed.

The control current computer 38 computes the command signal value, i.e., the target control current value, to be presented to the swashplate actuator 21 in order to obtain the target tilt angle calculated by the tilt angle computer 37. The controller 9 outputs a control current corresponding to the target control current value obtained as described above to the swashplate actuator 21.

Figure 4:
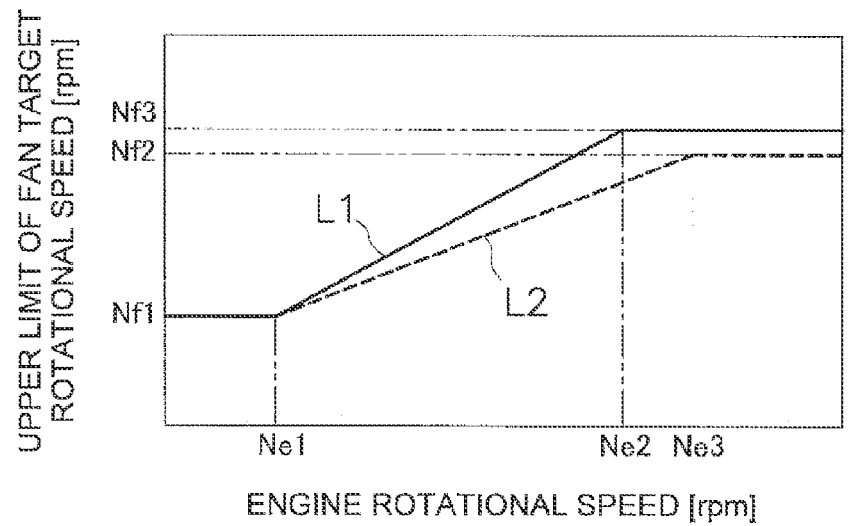
FIG. 4 is a view showing an example of the map for computing upper limit of the fan target rotational speed.

Computation of the upper limit of the fan target rotational speed by the upper limit computer 35 will next be described in detail. As described above, the upper limit computer 35 computes the upper limit of the fan target rotational speed from the engine rotational speed. At this time, the upper limit computer 35 references a map stored in the memory unit 90. The memory unit 90 stores a first map L1 and a second map L2 for computing the upper limit of the fan target rotational speed, as shown in FIG. 4. The first map L1 and the second map L2 both indicate relationships between the engine rotational speed and the upper limit of the fan target rotational speed.

More specifically, in the first map L1, the upper limit of the fan target rotational speed is constant at Nf1 in the engine rotational speed range from zero to Ne1. In the engine rotational speed range from Ne1 to Ne2, the upper limit of the fan target rotational speed gradually increases in conjunction with the increase in engine rotational speed. In the engine rotational speed range of Ne2 and higher, the upper limit of the fan target rotational speed is constant at Nf3.

In the second map L2, the upper limit of the fan target rotational speed is constant at Nf1 in the engine rotational speed range from zero to Ne1, the same as in the first map L1. The upper limit of the fan target rotational speed also gradually increases in conjunction with the increase in engine rotational speed in the engine rotational speed range from Ne1 to Ne3. However, Ne3 is greater than Ne2. In the engine rotational speed range of Ne3 and higher, the upper limit of the fan target rotational speed is constant at Nf2. However, Nf2 is less than Nf3. Consequently, in the range of engine rotational speeds greater than Ne1, the second map L2 is defined such that the upper limit of the fan target rotational speed is set lower than in the first map L1 for the same engine rotational speed. In the engine rotational speed range from Ne1 to Ne2, the difference between the upper limit of the fan target rotational speed in the first map L1 and the upper limit of the fan target rotational speed in the second map L2 increases the greater the engine rotational speed becomes.

Figure 5:
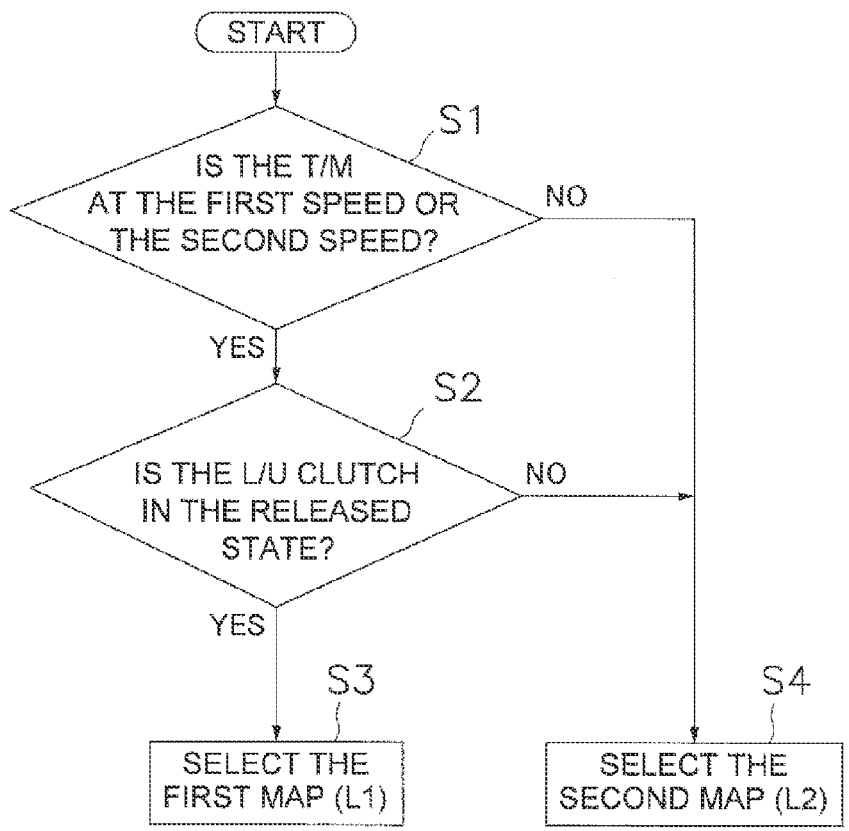
FIG. 5 is a flowchart showing the processing for selecting the map for computing the upper limit of the fan target rotational speed.

The upper limit computer 35 selects either the first map L1 or the second map L2 as the map for computing the upper limit of the fan target rotational speed according to the flow shown in FIG. 5. First, in step S1, a determination is made as to whether the speed gear of the transmission 61 is the first speed or the second speed. When the speed gear of the transmission 61 is not the first speed or the second speed, i.e., when the speed gear of the transmission 61 is the third speed, the process proceeds to step 34, and the second map L2 is selected. When the speed gear of the transmission 61 in step S1 is the first speed or the second speed, the process proceeds to step S2. In step S2, a determination is made as to whether the lock-up clutch LC is in the released state. When the lock-up clutch LC is in the released state, the process proceeds to step S3, and the first map L1 is selected. When the lock-up clutch LC is not in the released state in step S2, i.e., when the lock-up clutch LC is in the engaged state, the process proceeds to step S4, and the second map L2 is selected.

As described above, when the speed gear of the transmission 61 is the third speed, the upper limit computer 35 sets the upper limit of the fan target rotational speed on the basis of the second map L2 regardless of whether the lock-up clutch LC is in the engaged state or the released state. The upper limit computer 35 also sets the upper limit of the fan target rotational speed on the basis of the second map L2 when the speed gear of the transmission 61 is the first or second speed and the lock-up clutch LC is in the engaged state. However, when the speed gear of the transmission 61 is the first or second speed and the lock-up clutch LC is in the released state, the upper limit computer 35 sets the upper limit of the fan target rotational speed on the basis of the first map L1. In the second map L2, the upper limit of the fan target rotational speed is set lower than in the first map L1 for the same engine rotational speed. Consequently, when the speed gear of the transmission 61 is the first or second speed, the upper limit of the fan target rotational speed when the lock-up clutch LC is in the engaged state is reduced by the upper limit computer 35 further than the upper limit value of the fan target rotational speed when the lock-up clutch LC is in the released state.

The work vehicle 1 and method for controlling the work vehicle 1 according to the present embodiment have the features described below.

The upper limit of the fan target rotational speed is reduced further when the lock-up clutch LC is in the engaged state than when the lock-up clutch LC is in the released state. When the lock-up clutch LC is in the released state, the drive power from the engine 5 is transmitted in the torque converter 60 via the torque converter oil. The torque converter oil is therefore heated significantly. On the other hand, when the lock-up clutch LC is in the engaged state, the input shaft and output shaft of the torque converter 60 are directly coupled via the lock-up clutch LC. There is therefore small heating of the torque converter oil. Consequently, the ability to cool the torque converter oil may be smaller when the lock-up clutch LC is in the engaged state than when the lock-up clutch LC is in the released state. Therefore, by reducing the upper limit of the fan target rotational speed when the lock-up clutch LC is in the engaged state, an excess of cooling ability is prevented, and fuel economy can be enhanced.

The upper limit of the fan target rotational speed is set on the basis of the first map L1 when the lock-up clutch LC is in the released state. When the first map L1 is used, the upper limit of the fan target rotational speed is set higher than when the second map L2 is used. A high cooling ability can therefore be maintained. When the lock-up clutch LC is in the engaged state, however, the upper limit of the fan target rotational speed is set on the basis of the second map L2. Since a low upper limit is therefore set for the fan target rotational speed, an excess of cooling ability is prevented, and fuel economy can be enhanced.

When the speed gear of the transmission 61 is the third speed, which is the highest speed gear, the upper limit of the fan target rotational speed is set on the basis of the second map L2 even when the lock-up clutch LC is in the released state. When the speed gear of the transmission 61 is a high-speed gear, a favorable heat balance can easily be maintained in the work vehicle 1 even when the cooling ability of the cooling fan 72 is low. An inadequate cooling ability is therefore prevented even when the lock-up clutch LC is in the released state. An excess of cooling ability by the cooling fan 72 is also prevented, and fuel economy can thereby be enhanced.

An embodiment of the present invention is described above, but the present invention is not limited by the embodiment described above, and various modifications thereof are possible within the intended scope of the invention.

For example, a bulldozer is described as an example of the work vehicle 1 in the embodiment described above, but the present invention is also applicable to other work vehicles.

In the embodiment described above, maps are used as the information indicating the relationship between the engine rotational speed and the upper limit of the fan target rotational speed, but the information format is not limited to a map. For example, a table, a computational formula, or the like may also be used as the information for indicating the relationship between the engine rotational speed and the upper limit of the fan target rotational speed.

In the embodiment described above, the map used to compute the upper limit of the fan target rotational speed is selected from a first map L1 and a second map L2, but the map may be selected from among three or more maps.

In the embodiment described above, when the speed gear of the transmission 61 is the third speed, the second map L2 is selected regardless of the state of the lock-up clutch LC. However, the speed gear of the transmission 61 is not limited to the third speed in this selection, and the second map L2 may be selected regardless of the state of the lock-up clutch LC when the speed gear is a predetermined higher speed gear than the lowest speed gear. For example, a configuration may be adopted in which the second map L2 is selected when the speed gear of the transmission 61 is the second speed, regardless of the state of the lock-up clutch LC. The highest speed gear of the transmission 61 is also not limited to a third speed, and may be a fourth or higher speed. Consequently the second map L2 may be selected when the speed gear of the transmission 61 is the fourth speed, or when the speed gear of the transmission 61 is the third or fourth speed, regardless of the state of the lock-up clutch LC.

The above described embodiments of the present invention have the effect of enhancing fuel economy by preventing an excess of cooling ability. The above described embodiments of the present invention are therefore useful as a work vehicle and as a method for controlling a work vehicle.

The invention claimed is:

1. A work vehicle comprising:
   an engine;
   a travel device configured and arranged to cause the vehicle to travel;
   a power transmission device configured and arranged to transmit drive power from the engine to the travel device, the power transmission device having a transmission and a torque converter equipped with a lock-up clutch;
   a cooling fan configured and arranged to cool a coolant of the engine and a power transmission fluid of the torque converter; and
   a controller configured to set an upper limit of a target rotational speed of the cooling fan in accordance with an engine rotational speed, wherein
   the controller being configured to reduce the upper limit of the target rotational speed further when the lock-up clutch is in an engaged state than when the lock-up clutch is in a released state, wherein
   the controller is configured to store first information indicating a relationship between the engine rotational speed and the upper limit of the target rotational speed, and second information indicating a relationship between the engine rotational speed and the upper limit of the target rotational speed and setting the upper limit of the target rotational speed to a lower value than indicated in the first information; and
   the controller is configured to set the upper limit of the target rotational speed based on the first information when the lock-up clutch is in the released state, and to set the upper limit of the target rotational speed based on the second information when the lock-up clutch is in the engaged state.

2. The work vehicle according to claim 1, wherein
   the controller is configured to set the upper limit of the target rotational speed based on the second information regardless of whether the lock-up clutch is in the engaged state or the released state when a speed gear of the transmission is at a predetermined high-speed gear having a higher speed than a lowest-speed gear.

3. A method for controlling a work vehicle, the work vehicle being provided with an engine; a travel device for causing the vehicle to travel; a power transmission device for transmitting drive power from the engine to the travel device, the power transmission device having a torque converter equipped with a lock-up clutch, and a transmission; and a cooling fan for cooling a coolant of the engine and a power transmission fluid of the torque converter; the method for controlling a work vehicle comprising:
   setting an upper limit of a target rotational speed of the cooling fan in accordance with an engine rotational speed such that the upper limit of the target rotational speed is reduced further when the lock-up clutch is in an engaged state than when the lock-up clutch is in a released state; and
   storing first information indicating a relationship between the engine rotational speed and the upper limit of the target rotational speed, and second information indicating a relationship between the engine rotational speed and the upper limit of the target rotational speed and setting the upper limit of the target rotational speed to a lower value than indicated in the first information.

* * * * *